US007010596B2

(12) United States Patent
Bantz et al.

(10) Patent No.: US 7,010,596 B2
(45) Date of Patent: Mar. 7, 2006

(54) SYSTEM AND METHOD FOR THE ALLOCATION OF GRID COMPUTING TO NETWORK WORKSTATIONS

(75) Inventors: David Frederick Bantz, Chappaqua, NY (US); David Carroll Challener, Raleigh, NC (US); John Peter Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 10/064,287

(22) Filed: Jun. 28, 2002

(65) Prior Publication Data

US 2004/0003077 A1 Jan. 1, 2004

(51) Int. Cl.
*G06F 15/173* (2006.01)

(52) U.S. Cl. ............... 709/224; 718/102; 718/105; 709/223; 709/226

(58) Field of Classification Search ............ 718/105, 718/102; 709/200, 201, 203, 217, 223–224, 709/226
See application file for complete search history.

(56) References Cited

U.S. PATENT DOCUMENTS

| | | | |
|---|---|---|---|
| 4,564,903 A | 1/1986 | Guyette et al. | |
| 5,450,583 A | 9/1995 | Inada | |
| 5,452,455 A | 9/1995 | Brown et al. | |
| 5,584,042 A | 12/1996 | Cormier et al. | |
| 5,600,805 A | 2/1997 | Fredericks et al. | |
| 5,819,047 A * | 10/1998 | Bauer et al. | 709/229 |
| 5,829,041 A | 10/1998 | Okamoto et al. | |
| 6,125,382 A | 9/2000 | Brobst et al. | |
| 6,185,619 B1 | 2/2001 | Joffe et al. | |
| 6,253,224 B1 | 6/2001 | Brice, Jr. et al. | |
| 6,256,637 B1 | 7/2001 | Venkatesh et al. | |
| 6,282,560 B1 * | 8/2001 | Eilert et al. | 718/100 |
| 6,385,639 B1 * | 5/2002 | Togawa | 709/200 |
| 6,418,462 B1 * | 7/2002 | Xu | 709/201 |
| 6,732,141 B1 * | 5/2004 | Ellis | 709/201 |
| 6,760,910 B1 * | 7/2004 | Eilert et al. | 718/104 |
| 6,775,831 B1 * | 8/2004 | Carrasco et al. | 707/200 |
| 6,779,016 B1 * | 8/2004 | Aziz et al. | 709/201 |
| 6,845,009 B1 * | 1/2005 | Whitted | 361/695 |
| 6,845,503 B1 * | 1/2005 | Carlson et al. | 717/166 |
| 6,865,591 B1 * | 3/2005 | Garg et al. | 709/201 |
| 6,886,035 B1 * | 4/2005 | Wolff | 709/219 |
| 6,891,802 B1 * | 5/2005 | Hubbard | 370/241 |

\* cited by examiner

*Primary Examiner*—Bharat Barot
*Assistant Examiner*—Faruk Hamza
(74) *Attorney, Agent, or Firm*—Jeanine S. Ray-Yarletts

(57) ABSTRACT

In a network of workstations implementing a grid for sharing workstation resources while maintaining local workstation workloads, grid workloads are assigned to workstations depending on how busy they are with the local workload. CPU utilization is monitored at each workstation and grid workload is only accepted if it can be handled without impacting the interactive performance of the workstation and in alignment with the workstation user's preferences. Also, grid workloads may be categorized by the extent to which they tie up workstation resources and this categorization used as further input to the grid workload assignment process.

6 Claims, 3 Drawing Sheets

SYSTEM AND METHOD FOR THE ALLOCATION OF GRID COMPUTING TO NETWORK WORKSTATIONS

BACKGROUND OF INVENTION

In every modern organization of any size, whether in an academic or industrial setting, there is a proliferation of desktop systems (or personal computers or workstations, all terms which will be used interchangeably herein). These systems are almost always connected to a network but are primarily geared toward interactive desktop computations in response to the needs and uses of an end user (called the "interactive workload" of the workstation). A characteristic of these systems is that they are relatively resource rich (in terms of CPU (central processing unit) power, memory and disk capacity) but are utilized for only a small fraction of the time during the day. Even during peak working hours when they are in use, the average utilization of these machines is far less than their peak capacity. As an example, one study of CPU utilization in the workstations of typical software developers found that the average CPU utilization during working hours was less than 10%, dropping to near 0% during non-working hours. In any event, it is well accepted by those skilled in the art that networked desktop systems represent vast computing resources that are severely under utilized.

The revolutionary increases in processor speed, disk size and speed and the rapidly decreasing cost per increment of other resources, like RAM (Random Access Memory) over the past several years have far outstripped the increasing resource demands of new workstation applications. As a result, this under utilization of workstation resources is worsening. It is also an accepted fact that the vast majority of the useful interactive cycles (or "power") of the CPU in a typical workstation are used to create, modify and maintain the graphical user interface (GUI). But, modern system architectures increasingly include specialized and complex graphics processors (or graphics adapters) which offload much of the GUI-related workload from the main CPU, further increasing the opportunity represented by excess capacity.

It would clearly be desirable to be able to make meaningful use of this excess capacity by tying these networked workstations together somehow and utilizing the CPU cycles that are going to waste. When considering such an effort, however, one quickly encounters several concerns. These potential problems include (i) degradation of performance of the workstation with respect to its interactive workload due to the sharing of resources, (ii) concerns about the integrity of the workstation and the interactive workload due to exposure to an external, shared workload and (iii) the sheer complexity of infrastructure needed to meaningfully harness and manage the distributed resources.

Others have examined some of these issues and proposed solutions. In particular, method and standards have been developed and are evolving with respect to sharing and utilizing resources across machines in a network. This is known as "grid computing" or simply "grids" and techniques employed there are well known to those reasonably skilled in the arts relevant to the present invention. Two industry articles which may be referenced for general background information on grids are *The Physiology of the Grid: An Open Grid Services Architecture for Distributed Systems Integration*, by I. Foster et al, published by an organization known as Globus at their Internet web site in June 1992; and The *Grid: Blueprint for a New Computing Infrastructure*, by I. Foster et al, Morgan Kaufman, 1999. To the extent these papers are helpful in understanding the background of the present invention, they are incorporated by reference herein in their entirety.

The proposed and developing grid standards address the problems of managing the complexity of utilizing the shared resources of the workstations in the grid. However, typical grid environments include workstations (or grid nodes) that are dedicated to performing work assigned by the grid (called the grid workload)—that is, the workstations do not have an interactive workload to contend with. For this reason, the grid techniques and standards which have been developed do not address the other concerns mentioned above, namely the potential performance and integrity impacts on the individual workstations of sharing their under utilized resources with the grid. Therefore, known grid methods and implementations need to be improved so that it can be ensured that any grid workload assigned to a network workstation must be able to be instantly preempted so that the workstation's interactive performance is not compromised. It also must be ensured that failures or faults occurring while executing the grid workload cannot compromise the integrity of the interactive workload.

For these reasons, and others readily identified by those skilled in the art, it would be desirable to develop techniques to allow the sharing of under utilized resources on the workstations in a computer network using known grid computing standards while maintaining the integrity and performance parameters of the individual workstations relative to their interactive workload.

SUMMARY OF INVENTION

The present invention contemplates a method, and a system implementing such a method, applicable to the grid computing environment whereby effective use may be made of the under utilized resources of the workstations on a network without impacting the interactive performance or integrity of the workstations. In realizing these and other purposes of the present invention, a method calls for the characterization of the availability of the workstation resources and of the grid workload and the implementation of policies governing the use of the workstation resources for the grid workload which depend upon such characterizations. Workstations are monitored and characterized according to their availability for use by the grid. This characterization is based on the analysis and real-time monitoring of the CPU utilization level of the workstation using methods for such purpose which are well known to those reasonably skilled in the relevant arts. Grid workloads are characterized according to the extent to which each will tie up workstation resources for extended periods of time. Such characterizations can be performed using simulation modeling or by analysis of the grid workload. Rules are then established and implemented governing which types of grid workload(s) may be scheduled on workstation(s) in certain identified availability states. In short, grid workloads are only scheduled on workstations which have been characterized as available and grid workloads which have been characterized as especially hard on workstation resources are only scheduled on workstations that are completely idle. Such rules allow the grid to perform useful work while ensuring that the workstations maintain their expected levels of interactive performance and integrity.

BRIEF DESCRIPTION OF DRAWINGS

Some of the purposes of the invention having been stated, others will appear as the description proceeds, when taken in conjunction with the accompanying drawing, in which.

DETAILED DESCRIPTION

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Devices and systems and the relevant standards regarding grid computing environments, and other systems or standards which provide for the sharing of workstation resources on a network, whether now known or developed in the future, are assumed to be well known to persons skilled in the relevant arts. Such devices and systems may be implemented in any of the many alternate embodiments that are available without departing from the spirit of the present invention. Detailed descriptions of such devices and systems, and the underlying resource-sharing mechanisms, are not required for an understanding of the present invention. This invention relates to an improvement to the method of operation of such devices and systems.

Preferably, each network workstation is equipped with a hypervisor, software running on the workstation that implements a computing concept known as "virtual machines". Hypervisors have been described in the paper Summary of Virtual Machine Research, *IEEE Computer Magazine*, 1974, vol.7, no. 6, pp 34–45, R. P. Goldberg. Virtual machines provide a partitioning of the execution environment between the interactive workload of a workstation and its potential grid workload, such that the grid workload is contained and protected in the virtual machine. Virtual machines have been well known to those of reasonable skill in the art for many years and a detailed treatment of virtual machines is not necessary for the understanding of the present invention. Virtual machines provide one possible mechanism by which each network workstation of the present invention might maintain some logical separation between the workstation's interactive workload and the grid workload assigned to the workstation. To the extent necessary to understand the background of the present invention, the above paper is incorporated herein by reference in its entirety.

Figure 1:
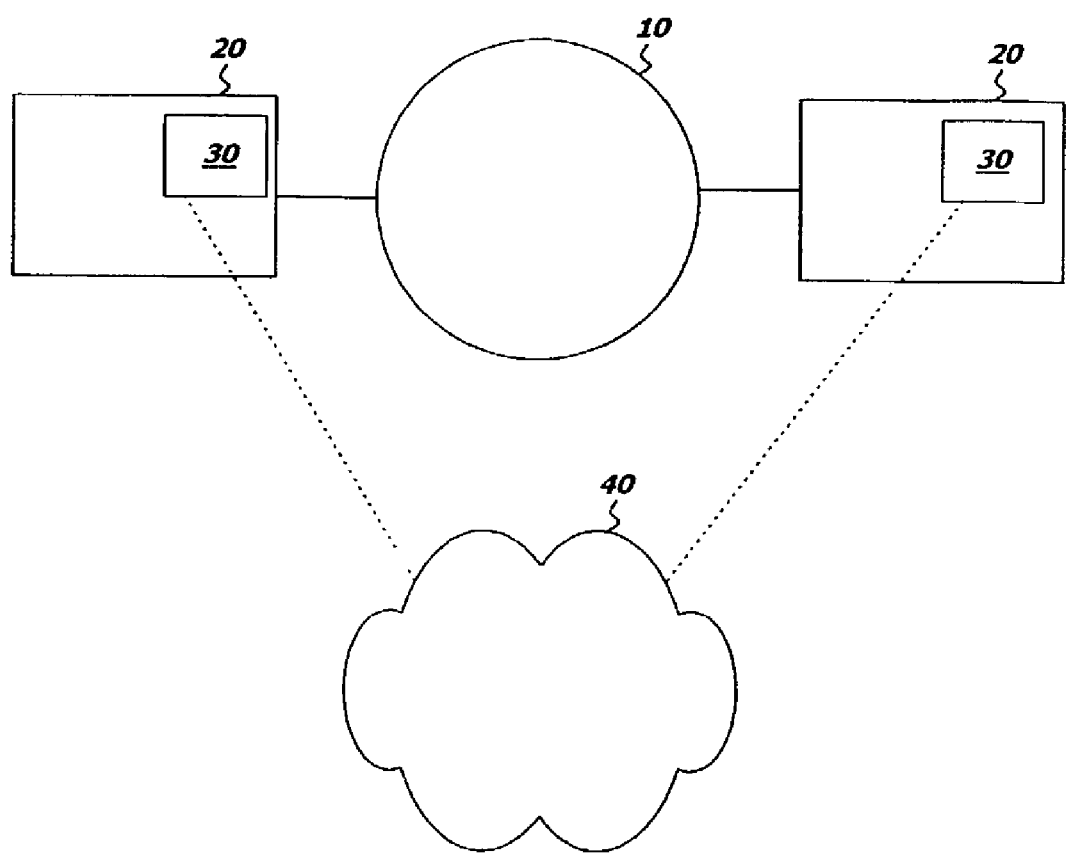
FIG. 1 is a figurative illustration of a computer network and grid according to the present invention.

In accordance with the present invention, and with reference to FIG. 1, a computer network 10 includes two or more workstations 20, each of which includes the resources typical in a modern workstation, e.g. a CPU, disk drive(s), memory, etc. Of special interest here is the CPU 30. As discussed above, the resources on the workstations 20 are grossly under utilized and are, in fact, idle most of the time. As such, the excess CPU cycles may be combined into a kind of virtual computer 40 which may be used to perform useful work. This virtual computer is known as a grid or a grid environment and is created using techniques and standards which are well known to those of reasonable skill in the art, as discussed above. The work done by the grid is known as a grid workload and the components of that grid workload are known as grid computations. This virtual computer or grid 40 has no independent physical presence but exists simply as the shared excess CPU cycles of workstations 20 as combined and managed to perform grid computations using any of the several embodiments of grid computing standards well known to those skilled in the art.

Figure 2:
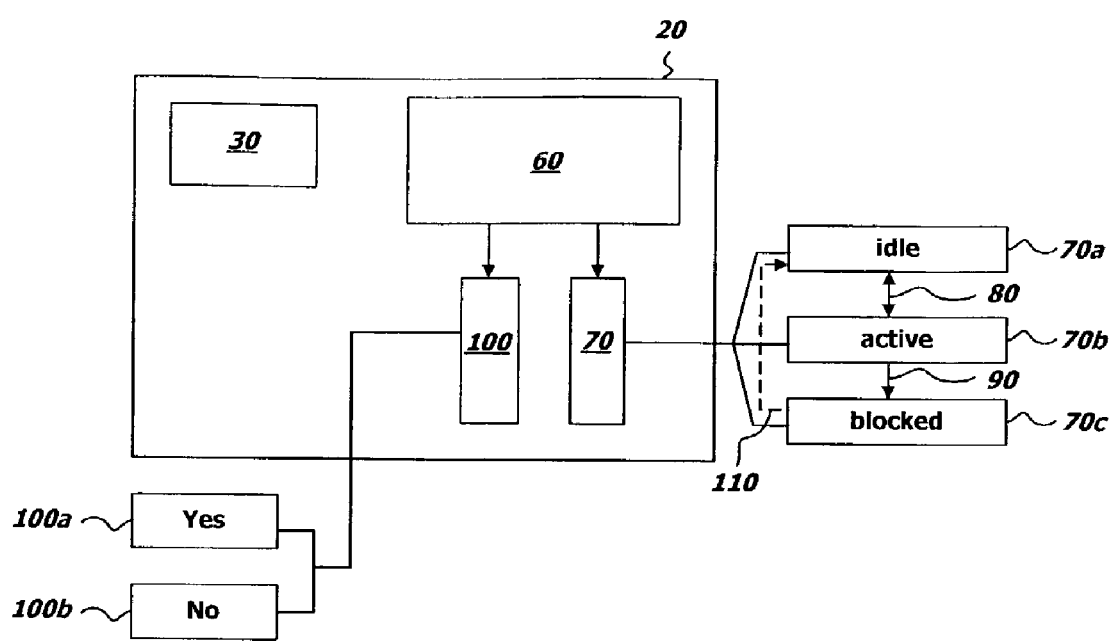
FIG. 2 is a is a block diagram of a workstation according to the present invention and related data structure.

In order to preserve the interactive performance level of the workstations 20, a grid system operating according to the present invention maintains a characterization of the state of each workstation. The state of a workstation 20 indicates the extent to which the workstation can allow its CPU cycles to be used to perform grid computations without compromising its interactive performance. In accordance with the present invention, and with reference to FIG. 2, each workstation has executing in it a workstation monitor 60. The workstation monitor 60 is a process or service executing on the operating system (not shown) of the workstation 20. The workstation monitor 60 samples and filters the CPU utilization level of the workstation via operating system functions which are well known and present in any modern workstation. At any point in time, the workstation monitor 60 identifies each workstation 20 as being in one of three states; idle, active or blocked. This determination can be the same or similar to that used by many workstations today when deciding whether to activate a screensaver or enter a power-saving idle state. The workstation monitor 60 must filter the CPU initialization data with an appropriate time constant so that very short bursts of CPU activity is not misinterpreted as an active state. On the other hand, the workstation monitor 60 should recognize very quickly that the workstation 20 has entered the idle state. The state of the workstation 20 may be maintained as a state variable 70 stored in the memory (not shown) of the workstation 20, or by using any other method known to those skilled in the art for recording and retrieving such information. A workstation 20 will transition 80 between the idle 70a and active 70b states as the workstation monitor 60 recognizes changes in the CPU utilization level of the machine, just as a screensaver will activate after a machine has been idle for a certain amount of time and then deactivate when the machine is placed back into use. The exact time constant used by the workstation monitor 60 for filtering the CPU utilization data and the amount of idle time necessary for the workstation 20 to transition from the active state 70b to the idle state 70a, can be configured by a user or the system designer as appropriate for the given application.

The workstation 20 may only transition 90 to the blocked state 70c from the active state 70b. In accordance with the present invention, when the software implementing the present invention is initially loaded onto the workstation 20 or when the workstation 20 is originally configured for use in a grid environment implementing the present invention, a user dialog (not shown) is presented to the user, asking if the workstation may be used for grid work when it is in the active state 70b. If the user answers in the affirmative, a grid preference variable 100 in the workstation 20 is set to yes, otherwise it is set to no. When the workstation monitor transitions 80 the workstation from the idle state 70a to the active state 70b, it checks the value of the grid preference variable 100. If the value of the grid preference variable 100 is no 100b, the workstation monitor 60 transitions 90 the workstation 20 to the blocked state 70c. If the value of the grid preference variable is yes 100*a*, the workstation 20 remains in the active state 70*b*. No grid computations will be accepted on the workstation 20 while it remains in the blocked state 70*c*. The workstation remains in the blocked state 70*c* until the workstation monitor 60 recognizes an idle condition as described above and transitions 110 the workstation 20 to the idle state 70*a*.

As readily recognized by those skilled in the relevant arts, the state variable 70 and the grid preference variable 100 may be stored as binary bits or combinations of bits in the memory (not shown) of the workstation 20. For example, the three possible values of the state variable 70 may be represented by the two bit combinations 00, 01 and 11 while the two possible values of the grid preference variable 100 may simply be represented by one bit having a value of 0 or 1.

In addition to the above characterization of the state of the network workstations 20, a system operating according to the present invention may preferably also characterize each proposed grid workload into one of two categories. Each grid workload is categorized as either preemptable or non-preemptable. A preemptable grid workload uses only workstation resources that can be instantly reassigned. In particular, a preemptable grid workload does not lock any workstation data structures or resources for significant periods of time. All other grid workloads are non-preemptable. As discussed below, this categorization of grid workloads allows a system according to the present invention to further preserve the interactive performance capabilities of the network workstations 20.

Figure 3:
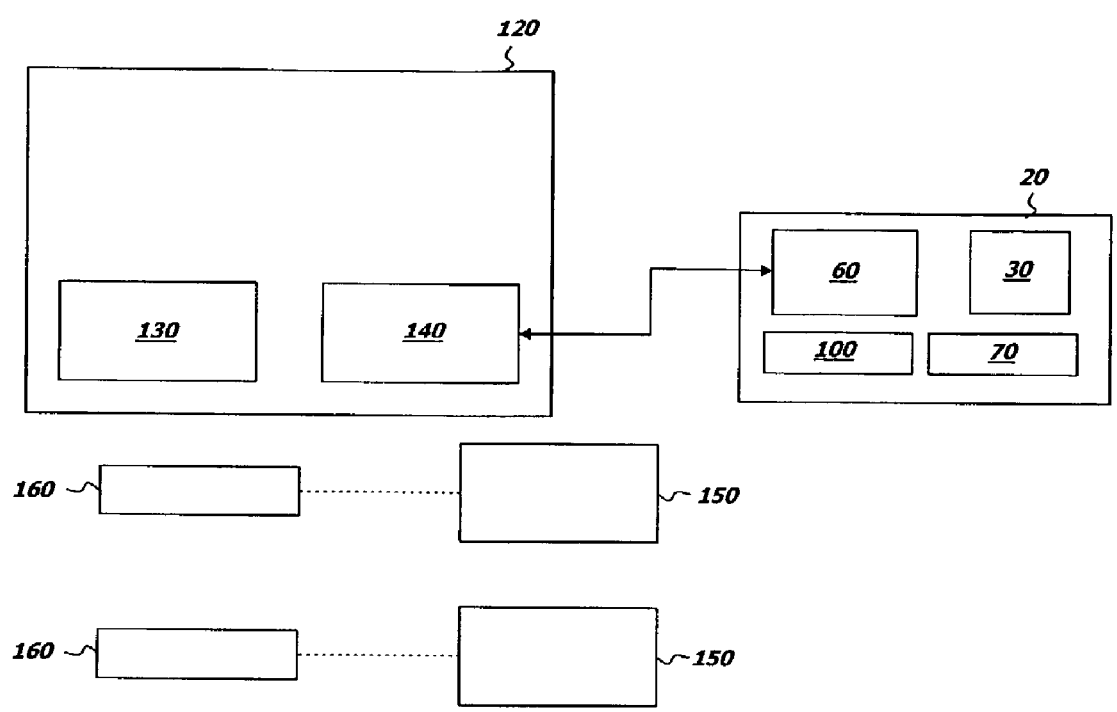
FIG. 3 is a a figurative block diagram of a grid workload manager of the present invention.

In accordance with the present invention, and with reference to FIG. 3, a grid workload manager 120 includes a workload analyzer 130 and a workload scheduler 140. The grid workload manager 120 is a program that may run as a single instance (process or service) on a dedicated computer (not shown) on the network 10 or on one of the network workstations 20, sharing CPU cycles with the interactive workload of the workstation 20. Alternatively, the grid workload manager 120 may be implemented as a distributed program across the network.

The workload analyzer 130, running offline, or not in real time, analyzes each computer program representing a grid workload 150 and categorizes it as preemptable or non-preemptable. In order to perform this analysis, the workload analyzer 130 preferably traces the program flow and records each instance where the program causes a global resource lock, disables interrupts or takes other actions judged to occupy resources for significant periods of time. If the analysis determines that the amount of time that the resources are so locked by the grid workload is unbounded, or is dependent upon the data with which the workload is working, that program is judged non-preemptable. The workload analyzer 130 may be configured or designed to utilize any other reasonable criteria to judge the preemptability of the workload, as designed by the user or system designer.

Alternatively, the workload analyzer 130 may categorize a grid workload by running the program representing the workload on an available virtual machine, for example, and randomly interrupting it. The workload analyzer 130 then records the time it takes the program to respond to the interruption. An analysis of the average time the program takes to respond to these random interrupts would allow the workload analyzer 130 to categorize the workload as either preemptable or non-preemptable. The longer the response time, the more likely the workload will be deemed non-preemptable. A threshold can be designed into the workload analyzer 130 such that any grid workload having an average response time above the threshold would be categorized as non-preemptable, all others would be preemptable.

Using either method, or any other reasonable method which may be devised consistent with the purposes of the present invention, the grid workload analyzer 130 determines the characterization of each grid workload and maintains a category variable 160 associated with each grid workload 150. The category variable 160 may have a value of preemptable or non-preemptable. As discussed above with respect to the state variable 70 and the grid preference variable 100, the category variable 160 may be stored as a binary bit with, for example, 0 representing a value of preemptable and 1 representing a value of non-preemptable. The category variable 160 may reside in the memory (not shown) on the dedicated computer (not shown) or the network workstation 20 on which the grid workload manager 120 is executing, as applicable. Alternatively, if the grid workload manager is executing as a distributed program, the category variable may be located in any memory location to which the grid workload manager 120 has access. The grid workload(s) 150 are programs consisting of a series of computer program instructions which are intended to be executed on the grid 40 (FIG. 1). Each grid workload 150 has associated with it a category variable 160. This association between the grid workload 150 and the category variable 160 may be established via a pointer or any other data structure well known to those skilled in the computer arts such that the grid workload manager 120 can easily access the associated category variable 160 when attempting to schedule a grid workload 150 as discussed below.

Executing in realtime, the workload scheduler 140 attempts to schedule grid workloads 150 to the workstations 20 in the grid 40 as directed to do so by the grid workload manager 120. The grid workload manager 120 may request that the workload scheduler 140 schedule grid workload(s) 150 for execution according to a predetermined schedule or in response to some external stimuli from a user or another program (not shown). In accordance with the present invention, when attempting to schedule the grid workload(s) 150, the system takes into account the characterizations of the state of the workstation 20 and of the grid workload 150, if applicable.

To schedule a grid workload 150 to a network workstation 20, the workload scheduler 140 sends a request to the workstation monitor 60 executing on the workstation 20. In response to the scheduling request, the workstation monitor 60 checks the state of the workstation 20. If the state variable 70 has a value of idle 70*a* then the workstation monitor 60 accepts the grid workload 150 from the workload scheduler 140 and the grid workload begins executing on the workstation 20, preferably utilizing the virtual machine construct under a hypervisor, as discussed above.

If, upon receiving a scheduling request from the workload scheduler 140, the workstation monitor 60 discovers that the state variable 70 has a value of blocked 70*c* then the workstation monitor 60 refuses the scheduling request from the workload scheduler 140. If the workstation monitor 60 finds a state variable 70 value of active 70*b*, the workstation monitor checks the workstation's grid preference variable 100. If the grid preference variable 100 has a value of yes, then the workstation monitor 60 accepts the grid workload 150 from the workload scheduler 140 and the grid workload 150 begins executing on the workstation 20. If the grid preference variable 100 has a value of no, the workstation monitor updates the state variable 70 to blocked 70*c* and refuses the scheduling request from the workload scheduler 140. This double-check of the grid preference variable 100 accounts for the situation where a user or the system designer has changed the grid preference for a workstation after the initial configuration and ensures that the system abides by the user's preferences.

If a system according to the present invention has also implemented the categorization of the grid workload(s) 150 as discussed above, then those categorizations will preferably affect which workstations will accept submitted grid workloads 150. Operating accordingly, the workload scheduler 140 submits a scheduling request to a workstation 20, including the value of the category variable 160 associated with the submitted grid workload 150. Alternatively, the workstation monitor 60 might check the value of the associated category variable 160 by following a pointer to the variable passed by the workload scheduler 140 with the request. In any event, the workstation monitor considers the value of the category variable 160 in deciding whether to accept the grid workload, as follows.

In response to the scheduling request, the workstation monitor 60 checks the state of the workstation 20. If the state variable 70 has a value of idle 70a then the workstation monitor 60 accepts the grid workload 150 from the workload scheduler 140 no matter what the value of the category variable associated with the grid workload 150. As before, the grid workload 150 then executes on the workstation 20, preferably utilizing the virtual machine construct under a hypervisor, as discussed above. As before, if the workstation monitor 60 discovers that the state variable 70 has a value of blocked 70c then the workstation monitor 60 refuses the scheduling request from the workload scheduler 140, again, no matter the value of the category variable 160.

If, however, the workstation monitor 60 finds a state variable 70 value of active 70b, the workstation monitor 60 then checks the value of the category variable 160 associated with the submitted grid workload 150. If the category variable 160 has a value of non-preemptable, workstation monitor refuses the scheduling request from the workload scheduler 140. Even if the user has established a willingness to share the CPU cycles of the workstation 20 with a grid workload 150 as requested, a non-preemptable workload can seriously impact the resources of the workstation 20 and will not be allowed to run on an active workstation 20. If the category variable 160 has a value of preemptable, the workstation monitor 60 checks the workstation's grid preference variable 100. If the grid preference variable 100 has a value of yes, then the workstation monitor 60 accepts the grid workload 150 from the workload scheduler 140 and the grid workload 150 begins executing on the workstation 20. If the grid preference variable 100 has a value of no, the workstation monitor updates the workstation state variable to blocked 70c and refuses the scheduling request from the workload scheduler 140. As before, this double-check of the grid preference variable 100 accounts for the situation where a user or the system designer has changed the grid preference for a workstation after the initial configuration and ensures that the system abides by the user's preferences.

With respect to the functions and processes described and illustrated herein, each may be embodied in electronic circuitry (or hardware) or as a series of computer programming code instructions (or software) implementing the functions or steps described, or as a combination of hardware and software. For example, in this description and in the following claims where the workstation monitor 60 (FIG. 2) or the grid workload manager 120 (FIG. 3) is said to take some action or perform some function, that action or function may be effected by the execution of software in the memory (not shown) of the workstation 20 or other computer (not shown) on which the workstation monitor 60 or the grid workload manager 120 is running, as is well known by persons skilled in the relevant arts. Alternatively, such action or function may be effected by instructions implemented in the circuitry (not shown) of the relevant computer, again, using techniques well known by those skilled in the relevant arts.

As readily recognized by those skilled in the art, the exact order of the steps and processes illustrated and discussed herein may be varied in any advantageous manner without deviating from the present invention. Also, where appropriate, steps may be repeated, skipped or combined to better operate in a given environment.

In the drawings and specification there has been set forth preferred embodiments of the invention, and, although specific terms are used, the description thus given uses terminology in a generic and descriptive sense only and not for purposes of limitation.

What is claimed is:

1. In a computer network including at least two workstations and implementing a grid for executing a grid workload on shared resources of at least two workstations, a method of assigning said grid workload to one of the at least two workstations, the method comprising:

connecting a plurality of workstations in a network each workstation having available resources which are shared with other workstations across the network;

implementing a grid across the network;

executing grid workload on the resources which are shared among the plurality of workstations;

determining an activity state of a first workstation included in the grid, the activity state being indicative of a degree of current utilization of the first workstation by a local workload;

responding to a determination that the activity state of the first workstation indicates low utilization by assigning grid workload to the first workstation;

responding to a determination that the activity state of the first workstation indicates high utilization by determining a workstation preference for accepting grid workload on the first workstation when utilization is determined to be high;

responding to a determination that the workstation preference is yes by determining a delay level associated with the grid workload and indicative of an extent to which the grid workload will lock the resources of a workstation to which the arid workload is assigned; and responding to a determination that the activity state indicates high utilization and that the workstation preference is yes by assigning the grid workload to the first workstation only if the delay level indicates that the grid workload will lock the workstation resources to an extent below a threshold.

2. In a computer network including at least two workstations and implementing a grid for executing a grid workload on shared resources of at least two workstations, a method of assigning said grid workload to one of the at least two workstations, the method comprising:

connecting a plurality of workstations in a network, each workstation having available resources which are shared with other workstations across the network;

implementing a grid across the network;

executing grid workload on the resources which are shared among the plurality of workstations;

monitoring a utilization level indicative of the extent to which a local workload is utilizing the resources of a first workstation and setting a first workstation activity state to a selected one of three conditions;

a first condition being idle if the utilization level is below a first threshold;

a second condition being active if the utilization level is above the first threshold and the first workstation activity level is already idle or active; and a third condition being blocked if the utilization level is above the first threshold and the first workstation activity state is already blocked; and checking the first workstation activity state;

in response to a first workstation activity state of idle, assigning grid workload to the first workstation;

in response to a first workstation activity state of active, determining a first workstation preference for accepting grid workload when the first workstation activity state is active;

in response to a determination that the first workstation preference is yes, assigning grid workload to the first workstation; in response to a determination that the first workstation preference is no;

setting the first workstation activity state to blocked; and holding grid workload for assignment to another workstation; and in response to a first workstation activity state of blocked, holding grid workload for assignment to another workstation.

3. The method of claim 2, further comprising:

determining a delay level associated with grid workload and indicative of the extent to which grid workload will lock the resources of a workstation to which the arid workload is assigned; and in response to a first workstation activity state of active and a first workstation preference of yes, assigning grid workload to the first workstation only if the delay level indicates that the grid workload will lock the workstation resources to an extent below a second threshold.

4. In a computer network including at least two workstations and implementing a grid for executing a grid workload on shared resources of at least two workstations, a system for assigning said grid workload to one of the at least two workstations, the system comprising:

a plurality of workstations connected together in a network, each workstation having available resources which are shared with other workstations across the network;

computer executable instructions stored accessibly to and executing on said plurality of workstations which, when executing, implement a grid across the network and execute grid workload on the resources which are shared among the plurality of workstations;

a workstation monitor operatively associated with said workstations which determines (a) an activity state of a first workstation, the activity state being indicative of a degree of current utilization of said first workstation by a local workload; and (b) a workstation preference for accepting grid workload on said first workstation when utilization is high;

a grid workload monitor which determines a delay level associated with the grid workload and indicative of the extent to which the grid workload will lock the resources of a workstation to which the grid workload is assigned; and a workstation scheduler which:

(c) in response to a determination that the activity state indicates low utilization of said first workstation assigns grid workload to said first workstation; or (d) in response to a determination that the activity state indicates high utilization of said first workstation checks the workstation preference of said first workstation and in response to a workstation preference of yes, assigns the grid workload to said first workstation only if the delay level indicates that the grid workload will lock the workstation resources to an extent below a threshold; or (e) in response to a workstation preference of no holds the arid workload for assignment to another workstation.

5. In a computer network including at least two workstations and implementing a grid for executing a grid workload on shared resources of at least two workstations, a system for assigning said grid workload to one of the at least two workstations, the system comprising:

a plurality of workstations connected together in a network, each workstation having available resources which are shared with other workstations across the network;

computer executable instructions stored accessibly to and executing on said plurality of workstations which, when executing, implement a arid across the network and execute grid workload on the resources which are shared among the plurality of workstations;

a workstation monitor which (a) monitors a utilization level indicative of the extent to which a local workload is utilizing the resources of a first workstation and sets a first workstation activity state to a selected one of three conditions;

a first condition being idle if the utilization level is below a first threshold;

a second condition being active if the utilization level is above the first threshold and the first workstation activity level is already idle or active; and a third condition being blocked if the utilization level is above the first threshold and the first workstation activity state is already blocked; and (b) determines a first workstation preference for accepting grid workload when said first workstation activity state is active; and a workload scheduler which:

(c) checks said first workstation activity state;

(d) in response to a first workstation activity state of active, checks said first station preference;

(d1) in response to a first workstation preference of yes, assigns grid workload to said first workstation;

(d2) in response to a first workstation preference of no:

(d2a) sets said first workstation activity to blocked;

(d2b) holds grid workload for assignment to another workstation; and (e) in response to a first workstation activity state of blocked, holds grid workload for assignment to another workstation.

6. The system of claim 5, further comprising:

a grid workload monitor which determines a delay level associated with grid workload and indicative of the extent to which grid workload will lock the resources of a workstation to which grid workload is assigned, and wherein said workload scheduler, in response to a first workstation activity state of active and a first workstation preference of yes, assigns grid workload to said first workstation only if the delay level indicates that the grid workload will lock the workstation resources to an extent below a second threshold.

* * * * *